Jan. 5, 1932.  J. W. NOVOTNY  1,839,698
CABLE SPLICE
Filed Nov. 14, 1930   2 Sheets-Sheet 1
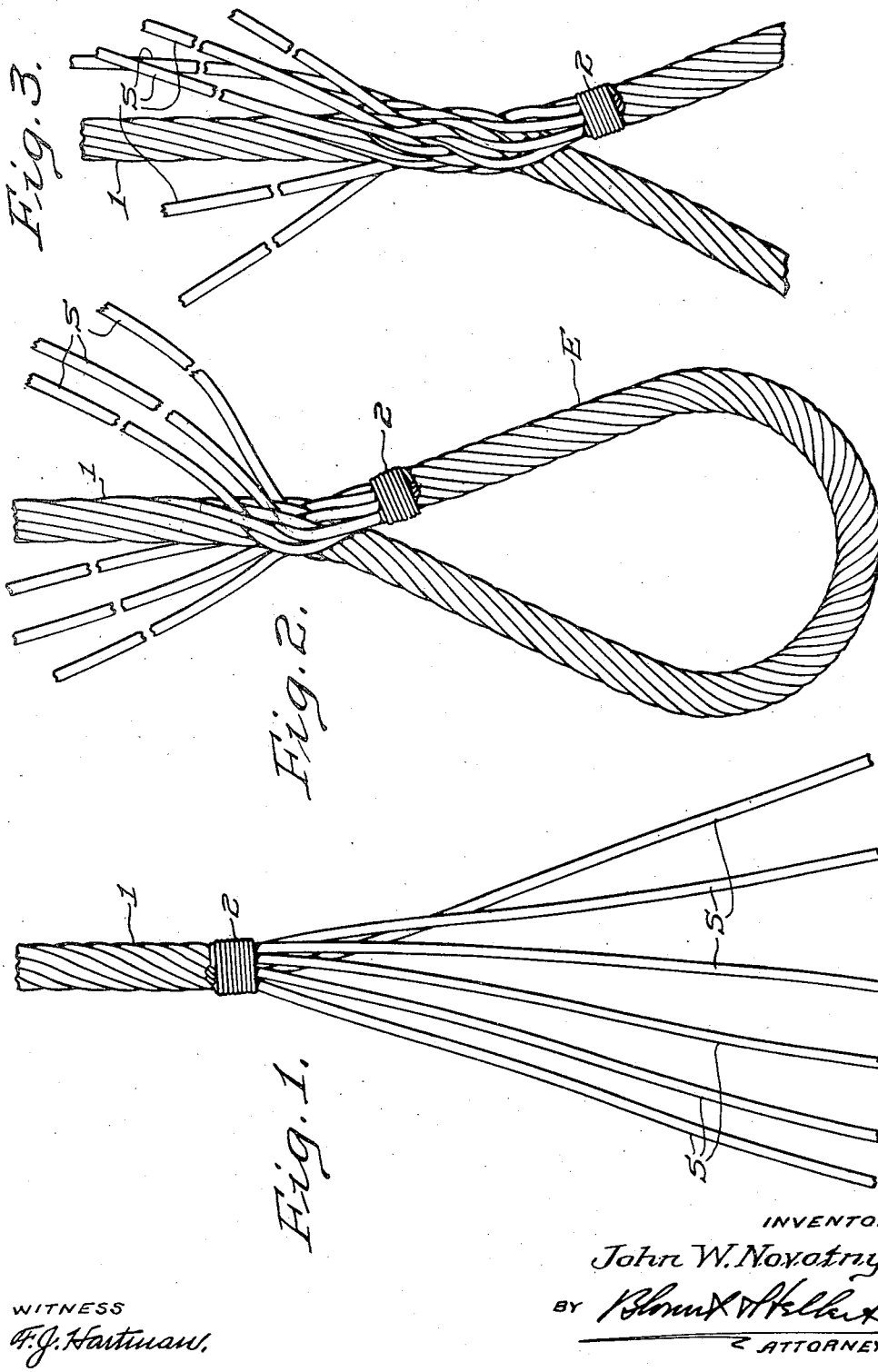
INVENTOR
John W. Novotny.
WITNESS Jan. 5, 1932. J. W. NOVOTNY 1,839,698
CABLE SPLICE
Filed Nov. 14, 1930 2 Sheets-Sheet 2
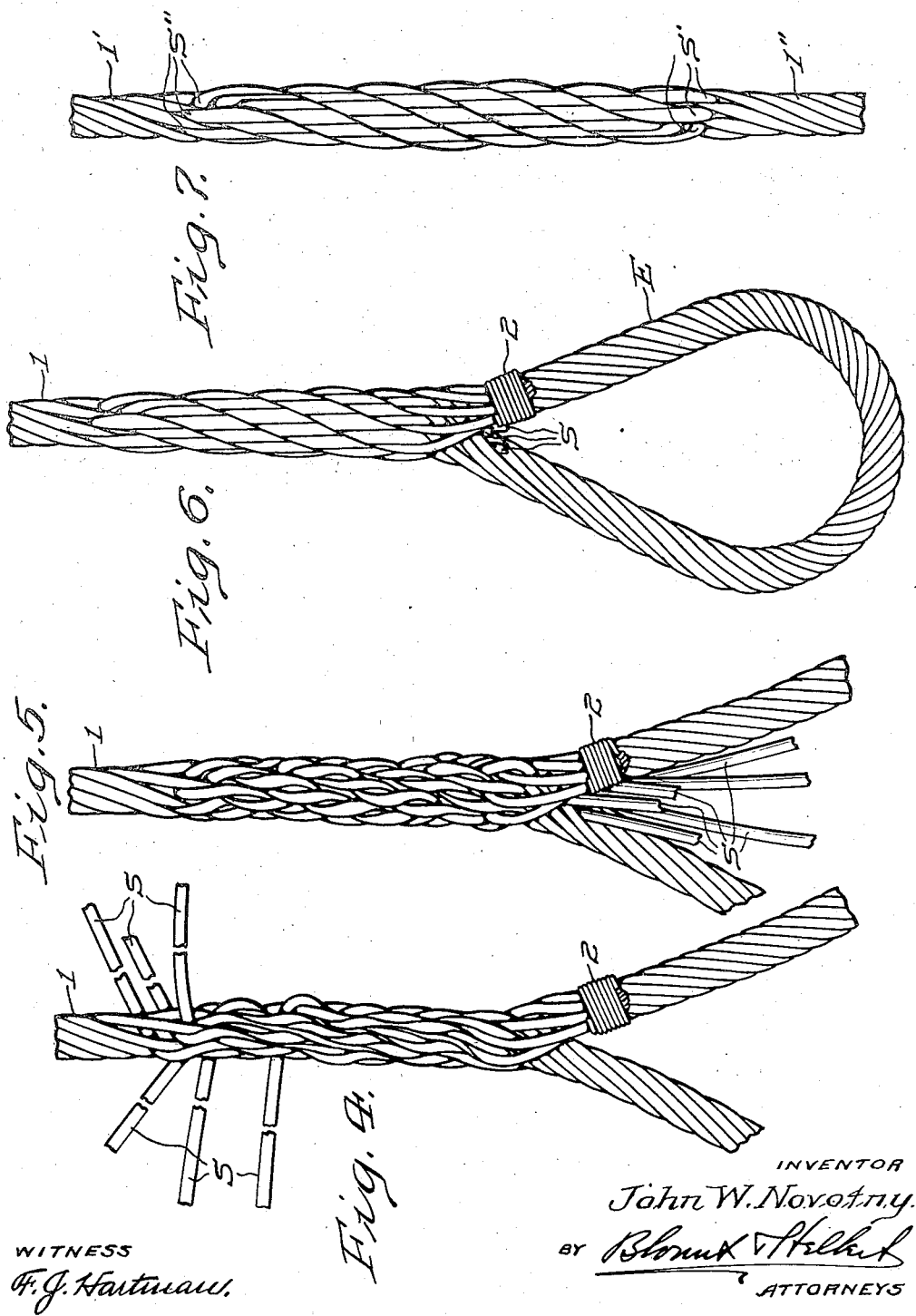

Patented Jan. 5, 1932

1,839,698

UNITED STATES PATENT OFFICE

JOHN W. NOVOTNY, OF YOUNGSTOWN, OHIO

CABLE SPLICE

Application filed November 14, 1930. Serial No. 495,617.

The present invention relates to an improved form of cable splice and more especially to a splice for cables composed of twisted strands of steel wire, and is particularly useful in the formation of sling eyes such as are ordinarily employed in steel cable slings and the like.

In splicing eyes in wire cable it has heretofore been the practice to unravel the end of the cable for a short distance and to then insert the unraveled strands between the strands of the cable at a point removed from its end a distance sufficient to provide an eye of the desired size; the unraveled strands are next threaded longitudinally of the cable a sufficient distance to provide the requisite strength in the splice, and the projecting ends of the strands finally cut off close to the cable. This form of splice is well known as applied not only to steel cables but also to rope and similarly stranded bodies in which a splice is to be made, and has been considered generally satisfactory in rope splices where the projecting ends of the strands are yielding and the rope itself is of such nature that the strands can be sufficiently tightly held in the splice to prevent them from being pulled out. When splices of this character are employed in steel cables, however, the friction between the unraveled strands in the cable end and the strands in the cable itself is considerably less than in the case of rope, due to the hardness of the steel and also to the fact that steel cable splices usually become saturated with grease or oil when in use in consequence of which the unraveled strands can frequently be relatively easily pulled out from the splice, whereby, when eyes which have been spliced in this manner are used in cable slings and the like for transporting heavy loads, the tendency of the strand ends to slip or pull out of the splice constitutes a source of danger or, at least, delay in the work. Furthermore, the wires of which the several strands of a steel cable are made are ordinarily quite stiff and as they cannot all be cut off exactly flush with the cable so as to form a perfectly smooth splice, many of the wires are frequently left projecting outwardly a short distance from the body of the cable adjacent the end of the splice and form almost needlelike points on the exterior surface of the cable which penetrate even through the thick leather gloves commonly worn when handling cables of this type and pierce the hand of the workman, frequently causing painful injury and sometimes even serious infection.

An object of my invention, therefore, is to provide a splice adapted particularly for use in forming a sling eye or the like at the end of the wire cable which is of such nature that the unraveled strands of the cable end which are used to form the splice are arranged in such a way that a strain on the eye tends rather to enhance the firmness with which the strands are held than to pull them out of place or permit them to slip from the splice.

A further object of my invention is to provide a splice of the character aforesaid in which the exterior surface of the cable adjacent the splice is devoid of projecting wires and in which the needlelike points of the latter are so positioned that the hands of a workman handling the cable are protected therefrom with resultant avoidance of danger of injury from this source.

A still further object of my invention is to provide a splice of this character which tapers smoothly and gradually into the cable at the end of the splice and thus presents a neat appearance and a smooth and regular contour.

Another object of the invention is to provide a splice of this nature which may be employed in splicing together the ends of a pair of cables and in which, when so employed, the ends of the strand wires project, if at all, at one point or zone only adjacent the center of the splice instead of at two separated points or zones at the opposite ends of the splice as in the form of splice commonly utilized for a like purpose.

Still other purposes, objects and advantages of my invention will be hereinafter more particularly stated or will be apparent from the following description of my improved splice and the manner of making it, in which reference will be made to the accompanying drawings in which Fig. 1 is a fragmentary side elevation of the end of a cable at the completion of the first step in making a splice in accordance with my invention; Fig. 2 is a similar view of the cable at the end of the next step when an eye splice is to be formed at the end thereof; Figs. 3, 4 and 5 are fragmentary views showing successive subsequent steps in the formation of the eye splice, and Fig. 6 is a view of the completed eye splice. Fig. 7 is a fragmentary view of a pair of cable ends joined together by means of my improved splice. In the several figures like characters are employed to designate the same parts.

Referring now more particularly to the drawings, in the formation of my splice the end of a cable 1 is unraveled preferably for a distance about twice that usually required in making eye splices in the ordinary manner, thus providing several untwisted strands S. The cable 1 may be wrapped with a wire 2 or secured by any other convenient binding means at the end of the unraveled portion to prevent its becoming unraveled farther than required for the purposes of the splice. The ensuing step in forming an eye splice in accordance with my invention is to loop the end of the cable in the usual manner and return the unraveled end to a point on the cable so located as to provide a loop or eye E of the desired size. The strands of the cable 1 are then separated in the usual manner and the several unraveled strands are each passed under one of the unseparated strands or through the cable in such manner that the unraveled strands and the unseparated strands alternate around the splice as shown in Fig. 2. The unraveled or untwisted strands S are then respectively spirally wrapped around an adjacent strand of the main portion of the cable 1 and longitudinally thereof away from the eye for a distance approximately equal to that through which the unraveled ends of the cable are threaded between the cable strands in forming splices of the character which have heretofore been employed, and which may be desirably sufficient to permit about three or four complete turns of each unraveled strand about its adjacent main strand; however, for convenience in making the splice, and also in order to assist in attaining a gradual taper towards the end thereof, I usually consider it preferable to wrap some of the strands a lesser number of turns about the adjacent strands in the cable than others, for example, to wrap some strands three times and others four times around their respective cable strands as shown in Fig. 4. The respective unraveled strands are then passed diametrically through the cable and are each similarly spirally wound in the opposite direction about another strand of the main portion of the cable back toward the crotch of the eye and are finally brought out through the end of the splice into the crotch as shown in Fig. 5, at which point the projecting ends are preferably cut off as closely as possible, although as these ends are substantially protected by the branches of the crotch they do not project outwardly from the splice so as to constitute a source of danger in handling the cable even when they are not cut off exactly flush.

A completed splice formed in accordance with my invention is shown in Fig. 6, from which it will be apparent that the upper end of the splice, as viewed in said figure, is substantially smoothly tapered towards the body of the cable from its point of greatest diameter due to the different distances through which the unraveled strands were wound back on the cable and the cut off ends of the strands are substantially confined and concealed within the crotch of the eye. Furthermore, as a tension strain placed upon the splice when the cable is in use tends to draw the strands of the main cable together more tightly, the individual unraveled strands, each of which has been wound spirally about two different strands of the cable in making the splice, are securely clamped between the cable strands with a firmness which is increased in proportion to the increase of the strain on the splice.

As shown in Fig. 7, my improved splice may also be employed in joining the ends of a pair of cables 1', 1'', in which case the end of each cable is unraveled a suitable distance and the unraveled strands then spirally wound about the strands of the other cable for a suitable distance beyond the point to which it was unraveled, then passed diametrically through the cable and finally brought back in the opposite direction by winding around adjacent strands, substantially as above described in connection with my improved eye splice, so that the ends of the unraveled strands S', S'' finally meet substantially at the center C of the splice where they are then cut off flush so as to provide a smooth finish or at least one in which the wire ends project only in one zone or area at the center of the splice instead of in two zones at opposite ends thereof as in splices which have heretofore been used for uniting a pair of wire cables. It is apparent that the advantages of strength and firmness which are present in my eye splice are also present in the cable splice shown in Fig. 7, the latter being substantially a duplication of the former.

I have herein described with some particularity my improved splice as employed in forming a sling eye and in joining the ends of a pair of wire cables but it may also be used for other purposes as well, and with ropes as well as with wire cables. Moreover, although for convenience I have shown the splice as applied to a six strand cable, it may, with equal facility, be applied to cables or ropes having any other number of strands and it will thus be understood that I do not desire or intend to limit or confine myself to the particular embodiments of the invention herein disclosed as changes and modifications will readily occur to those skilled in the art and may be effected without departing from the spirit and scope of the invention as defined in the appended claims.

Having thus described my invention, I claim and desire to protect by Letters Patent of the United States:

1. A cable splice of the class described, comprising initially untwisted cable strands spirally interwound with the twisted strands in the body of the cable, the winding of said strands being reversed in direction substantially at one end of the splice and then continued in the opposite direction.

2. A cable splice of the class described, in which the ends of the cable strands are respectively wound spirally in two substantially opposite directions longitudinally of the cable about other strands in the body thereof.

3. A cable splice of the class described, having the untwisted ends of the respective cable strands spirally wrapped about other twisted strands in the body portion of the cable, said first mentioned strands terminating in the splice substantially at the point of entry of said strands into said body portion.

4. A cable splice characterized by the fact that separated strands of the cable are respectively spirally wound in one direction longitudinally of the cable about other unseparated strands in the body thereof, then passed diametrically through said body and then spirally wound about other unseparated strands in said body substantially to their original point of entry thereinto.

5. A cable splice characterized by the fact that each cable strand is surrounded by separate spirally wound strands and each of said spirally wound strands is wound about two different cable strands and passed diametrically through the cable between said strands.

6. A cable splice characterized by the fact that each cable strand is surrounded by a plurality of separate spirally wound strands, each of which is wound about one cable strand and then about another cable strand lying substantially upon the opposite side of the cable from the first mentioned cable strand.

7. A cable splice characterized by the fact that each cable strand has a plurality of separate strands spirally wound about it, each of said separate strands being wound about a given cable strand in one direction and then in the opposite direction about another cable strand lying substantially upon the opposite side of the cable from the first mentioned cable strand.

8. The method of making a cable splice which comprises the steps of separating the several strands of a cable to a point removed from its end, inserting said separated strands between the strands of the cable at points still farther removed from its end, and leading each of said strands longitudinally of the cable in one direction, then diametrically through the cable and finally longitudinally of the cable in the opposite direction to a point adjacent the point of insertion of said strand in the cable.

9. The method of making a cable splice which comprises the steps of separating the several strands of a cable to a point removed from its end, inserting said strands respectively between the strands of the cable at points still farther removed from its end, leading said strands longitudinally of the cable in one direction, then diametrically through the cable, then longitudinally of the cable in the opposite direction to points adjacent the points of initial insertion of said strands in the cable and finally cutting off the projecting ends of said strands adjacent the outer surface of the splice.

10. The method of making a cable splice which comprises the steps of separating the several strands of the cable to a point removed from its end, inserting said separated strands respectively between the strands of the cable at points still farther removed from its end, then winding each of said strands spirally about one of the cable strands in one direction, then leading it diametrically through the cable, and thereafter winding it spirally about another of the cable strands in the opposite direction.

11. The method of making a cable splice which comprises the steps of separating the several strands of the cable to a point removed from its end, inserting said separated strands respectively between the strands of the cable at points still farther removed from its end, then winding each of said strands spirally about one of the cable strands and away from the last mentioned points, then leading it diametrically through the cable, and thereafter winding it spirally about another of the cable strands back to the vicinity of said points.

In witness whereof I have hereunto set my hand this 10th day of November, 1930.

JOHN W. NOVOTNY.